United States Patent
Zhou et al.

(10) Patent No.: US 11,132,994 B1
(45) Date of Patent: Sep. 28, 2021

(54) MULTI-DOMAIN DIALOG STATE TRACKING

(71) Applicant: Amazon Technologies, Inc., Seattle, WA (US)

(72) Inventors: Li Zhou, Sunnyvale, CA (US); Kevin Small, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 16/674,526

(22) Filed: Nov. 5, 2019

(51) Int. Cl.
| | |
|---|---|
| *G10L 15/00* | (2013.01) |
| *G10L 15/26* | (2006.01) |
| *G10L 15/18* | (2013.01) |
| *G10L 15/22* | (2006.01) |
| *G10L 15/30* | (2013.01) |
| *G06F 40/30* | (2020.01) |
| *G10L 15/16* | (2006.01) |

(52) U.S. Cl.
CPC .......... *G10L 15/1815* (2013.01); *G06F 40/30* (2020.01); *G10L 15/22* (2013.01); *G10L 15/30* (2013.01); *G10L 15/16* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,304,444 B2* | 5/2019 | Mathias | G06F 40/35 |
| 10,325,599 B1* | 6/2019 | Naidu | H04M 3/42068 |
| 10,453,117 B1* | 10/2019 | Reavely | G06Q 30/0645 |
| 2014/0379323 A1* | 12/2014 | Anastasakos | G06F 16/3329 704/9 |
| 2020/0410012 A1* | 12/2020 | Moon | G06N 3/049 |

* cited by examiner

*Primary Examiner* — Satwant K Singh
(74) *Attorney, Agent, or Firm* — Pierce Atwood LLP

(57) ABSTRACT

A system for processing user utterances and/or text based queries that tracks context data of a current dialog between the system and the user, can determine values for slots by determining if the value was mentioned in a previous turn of the dialog. The system may employ a question-answer model and construct a question including the domain name, slot name, and potential slot values. The system may process the previous turns of the dialog and the constructed question to determine the slot value. The system may track a dialog that relates to multiple domains and may determine the slot value based on a slot value that is mentioned in relation to another domain.

20 Claims, 14 Drawing Sheets

MULTI-DOMAIN DIALOG STATE TRACKING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech processing refers to the combination of speech recognition and natural language understanding processing techniques. Speech processing may also involve converting a user's speech into text data, which may then be provided to various text-based software applications.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
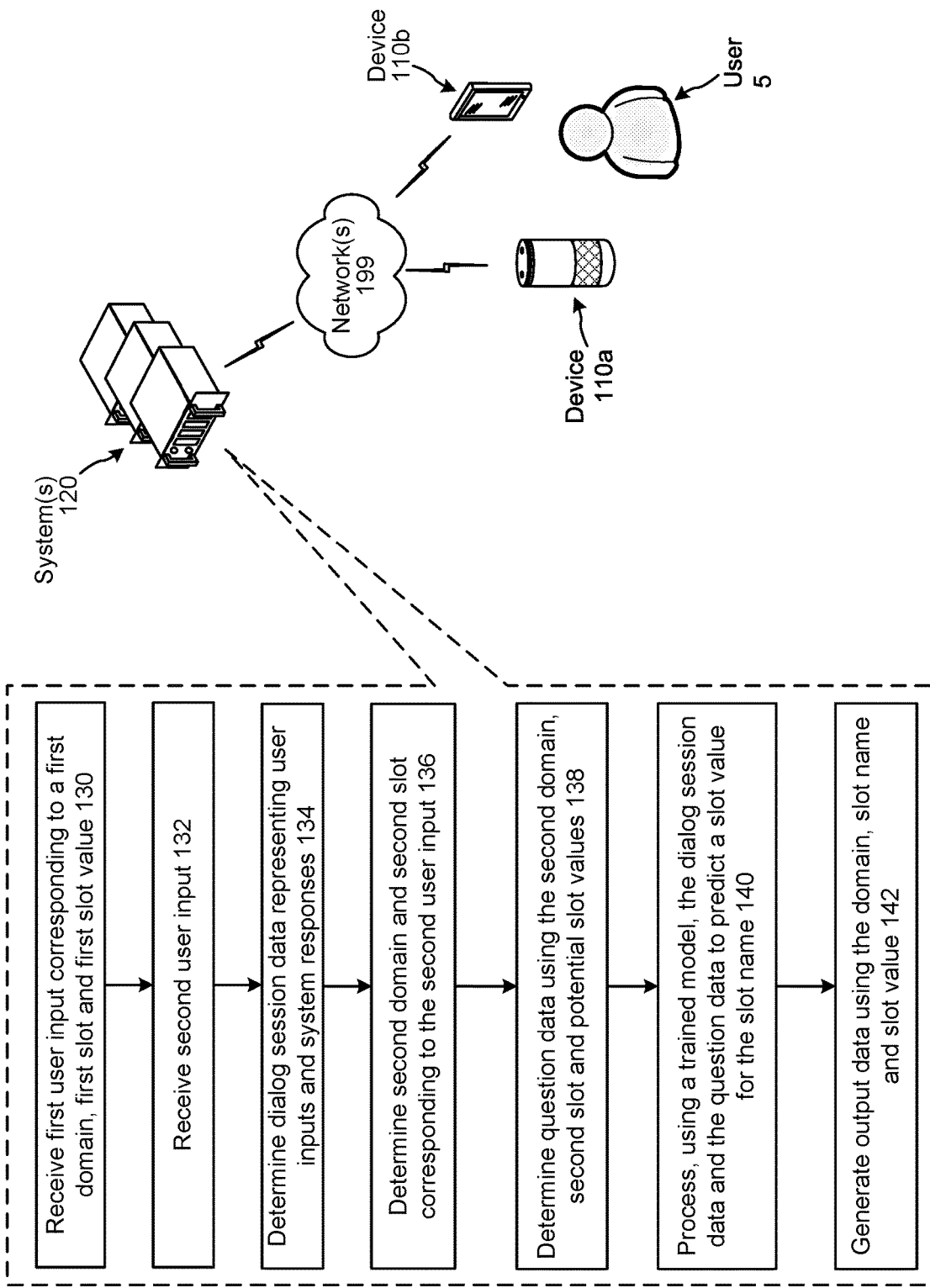
FIG. 1 illustrates a system configured to determine slot values using dialog context according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may also be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the dialog session identifier or other data to track the progress of the dialog to select system responses in a way that tracks the previous user-system exchanges, thus moving the dialog along in a manner that results in a desirable user experience. Existing systems may incorporate information such as the dialog history (which may include user inputs, system responses, or other data relevant to the dialog) in the natural language understanding (NLU) operations when interpreting user inputs so the system can select an appropriate response to what the user said.

For a dialog that relates to multiple domains, that is the user asks the system to perform tasks related to different domains or the system otherwise determines that another domain is best suited for a subsequent directive, dialog state tracking is an important function of a conversational system. A dialog state, as used herein, refers to a set of (key, value) pairs defined by the domain ontology, which indicates the structured representation of domains, slots and slot values. A key is a (domain, slot) pair, and a value may be a slot value indicated by the user during the dialog session.

In some embodiments, the system tracks multi-domain dialog states as a question-answering problem, in which the question asks for a pair of values (e.g., domain value, slot value). Furthermore, the system can be used for new or other types of unknown domains, slots and slot values, enabling updates to the domain ontology. The system can also be scalable to accommodate a large number of domains, slots, and slot values because of the structure of the question-answer model used.

The system employs a question-answer model, where the model reads the dialog context (user utterances and system responses) to answer questions that asks for the slot value corresponding to a (domain, slot) pair. A domain and slot corresponding to a user input may be represented as a (domain, slot) pair, for example, ('restaurant', 'price range') or ('restaurant', 'reservation time'). The system may form a question using the (domain, slot) pair to determine the value for the slot corresponding to a current user input, where the slot value may be mentioned in a previous user input and/or a previous system generated response of the dialog. The model may work with two types of questions. One of which is a multiple choice type question that is constructed for a (domain, slot) pair with a limited number of value options for the slot. For example, for the value options for the slot in the ('restaurant', 'price range') pair may include cheap, moderate and expensive, and the constructed question that the system may answer is "has the price range of the restaurant been mentioned previously in the dialog, if yes, then which of these options is it: a) cheap, b) moderate or c) expensive?" The other type is a span prediction question that is constructed for a (domain, slot) pair where the values for the slot have a large number of options. For example, the value options for the slot in the ('restaurant', 'reservation time') pair may include any time of the day, which may be too many to enumerate as a multiple choice question. In this case, the constructed question may be open-ended, such as, "has the reservation time for the restaurant been mentioned previously in the dialog, if yes, then what is it?"

The system also uses a knowledge graph that represents the dialog context and evolves as the system makes predictions for the (domain, slot) value for each turn. The knowledge graph may be used to enhance the question-answer model's performance.

The system, using the knowledge graph, is also able to make inferences for domain, slot and slot values using information represented in multiple turns of the dialog session. For example, a user may ask a system to book a hotel with a 4 star rating and moderate price range in Cambridge, Mass., and the system may respond by confirming the hotel reservation. Then the user may ask "make a reservation at a European food restaurant near the hotel in the same price range as the hotel." The system, using the information in the previous turn, determines that the user wants a restaurant near the hotel's address and within in a moderate price range. Next the user may ask "reserve a car ride to the reservation." The system determines that the user wants a car ride from the hotel address to the restaurant address for the day of the restaurant reservation and for arriving at the time of the restaurant reservation. This is dialog session, thus, relates to three different domains (hotel, restaurant and taxi), and the system is able to determine slot values using information from previous turns of the dialog session.

Moreover, the system uses relationships between the domains and slots to determine the slot values. For example, the system infers that the likely destination for a taxi is the restaurant that the user booked in the previous turn, and if the user booked a 5 star hotel, then the user is likely looking for a highly ranked rather than lowly ranked restaurant. Such use of relationships further improves the performance of the system.

FIG. 1 illustrates a system configured to determine slot values using dialog context according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110a and/or device 110b local to a user 5 and one or more systems 120 connected across one or more networks 199.

As shown in FIG. 1, system(s) 120 receives (130) a first user input corresponding to a first domain, a first slot and a first slot value. The system(s) 120 may associated a dialog session identifier with the first user input. The system(s) 120 may generate dialog state data represented as (first domain, first slot, first slot value) to track the domain, slot and slot value information corresponding to the first user input. The system(s) 120 may perform an action based on the first domain, first slot and first slot value. The system(s) 120 may additionally or alternatively generate a response (a system response) based on the action performed or using the first domain, first slot and first slot value. The system(s) 120 may associate the dialog session identifier with the system response.

The system(s) 120 receives (132) a second user input. The user 5 may continue the dialog with the system and may provide another input in response to the system response. The system(s) 120 may determine the slot value corresponding to the second user input using previous user inputs for the dialog session.

The user input may include audio data 211 that corresponds to a user utterance. The utterance may be spoken by the user 5 and captured by the device 110a. User 5 and device 110a may be participating in a dialog session, where the user 5 may speak an utterance and the system(s) 120 may generate a text-to-speech response to the utterance, which is then sent to device 110a for playback. Alternatively, the input data may come in the form of text data 213, such as text data sent from device 110b as part of a text-based dialog between the user 5 and the system(s) 120. If the input data is audio data, the system(s) 120 may perform automatic speech recognition (ASR) using the input audio data to generate text data 213. The user input may also take another form, such as device motion data (e.g., a device being shaken or moved in a particular manner), gesture data (e.g., an image capture device detecting a user shrug or head nod, etc.), or some other form. For present purposes, the focus of the discussion may revolve around user inputs received in audio or text form, but other input forms are also possible. The system(s) 120 may generate a response to the user input.

The system(s) 120 determines (134) dialog session data representing one or more user inputs and one or more system-generated responses to the user inputs. The dialog session data includes text data representing the first user input/utterance, text data representing the first system generated response, text data representing the second user input and text data representing the second system generated response.

The system(s) 120 determines (136) second domain and second slot corresponding to the second user input. The system(s) 120 may process text data, from the dialog session data representing the second user input, to determine a domain corresponding to the second user input. The system(s) 120 may then determine a slot name corresponding to the user input based on the slot names associated with the determined domain and the information represented by the text data. For example, if the user input is "book a hotel in the moderate price range in Cambridge, Mass.," the system(s) 120 may determine that the corresponding domain is 'hotel' based on the user input including the word 'hotel' and the user's intent being to book a hotel. The system(s) 120 may then, using a domain ontology, determine that one of the slots corresponding to the domain 'hotel' is 'hotel location' and that the user input includes a location. As another example, the user input may be "make a reservation at a European food restaurant in the same price range as the hotel." The system(s) 120 may determine that the corresponding domain is 'restaurant' and that a corresponding slot is 'restaurant location.' In some embodiments, the first domain may be the same as the second domain. In other embodiments, the first domain may be different than the second domain.

The system(s) 120 determines (138) question data using the second domain, second slot and potential slot values. The system(s) 120 may be configured to predict the slot value for a slot corresponding to the user input. To do so, the system(s) 120 may employ a question-answer model. The system(s) 120 may construct a question in the form: (domain, slot, potential slot values). For example, for the user input "make a reservation at a European food restaurant in the same price range as the hotel," the system(s) 120 may determine the question data as ('restaurant', 'price range', 'cheap', 'moderate', 'expensive').

The system(s) 120 processes (140), using a trained model, the dialog session data and the question data to predict a slot value for the slot name. The trained model may be a question-answer model. The trained model may be configured to predict the slot value for a slot based on previous user inputs provided by the user within the dialog session. For example, the first user input may be "book a hotel in the moderate price range in Cambridge, Mass.," and the second user input (being processed by the system) may be "make a reservation at a European food restaurant in the same price range as the hotel." The trained model may process the dialog session data including the first user input and the second user input to determine the slot value for the slot 'price range' in the second user input using the price range for the hotel indicated in the first user input. Thus, the system(s) 120 may be configured to determine slot values based on dialog context, even when the dialog relates to multiple domains. Further details on how the system predicts the slot value are described in relation to FIGS. 9 and 10.

In some cases, the slot value may be represented in the system generated response. For example, the user input may be "tell me the price range of the hotel you just booked," and the system response may be "The price range of the hotel is moderate." The system(s) 120, by processing the dialog session data which includes the system generated responses, can determine the slot value from the system responses as well.

The system(s) 120 generates (142) output data using the domain, slot name and the predicted slot value. For example, the system(s) 120 may generate a system response suggesting a restaurant in the appropriate price range (TTS output or other form of output). In some cases, the system(s) 120 may send the slot value and other information to another component, such as, a skill system to perform an appropriate action, such as making a reservation at the restaurant.

In some embodiments, the system(s) 120 may determine a knowledge graph to track predicted (domain, slot) pair values. For example, the system(s) 120 may determine a first domain-slot node of the graph using the (domain, slot) pair corresponding to a previous user input and a first value node using the slot value corresponding to the previous user input. The system(s) 120 may determine a dialog state embedding using the first domain-slot node and the first value node. The system(s) 120 may process the encoded dialog session data, encoded question data and the dialog state embedding to determine the slot value corresponding to the instant user input.

The system(s) 120 may determine further domain-slot nodes and value nodes for the graph using the values determined and predicted by the system as described above. Using the knowledge graph the system(s) 120 is able to employ attention over domain, slot and slot values corresponding to previous turns in the dialog session. Further details of the knowledge graph are described below in relation to FIGS. 9 and 10.

In some embodiments, the system(s) 120 may determine encoded dialog session data by determining word-level embeddings corresponding to each word in the dialog session data. The system(s) 120 may also determine character-level embeddings corresponding to each character in the dialog session data. The system(s) 120 may concatenate or combine the word-level embeddings and the character-level embeddings to determine the encoded dialog session data. As described herein, the dialog session data may include first text data corresponding to the first user input, second text data corresponding to the first system response, third text data corresponding to the second user input, fourth text data corresponding to the second system response, and so on. The system(s) 120 may determine a first word-level embedding corresponding to a first word of the first user input and continue determine the word-level embeddings until all the words in the dialog session data are processed, and similarly for the character-level embeddings. Thus, the word-level embeddings and character-level embeddings may correspond to the user inputs and the system-generated responses.

In some embodiments, the system(s) 120 may further determine the encoded dialog session data by using role embeddings representing whether the word in the dialog was provided by the user or was provided by the system. The system(s) 120 may concatenate or combine the role embedding with the word-level embedding and the character-level embedding to determine the encoded dialog session data. For example, the system(s) 120 may determine that the first word embedding corresponds to a word of the user input and may combine a user-role embedding with the first word-level embedding. Similarly, the system(s) 120 may determine that the second word embedding corresponds to a word of the system-generated response and may combine a system (agent)-role embedding with the second word-level embedding. Thus, the system(s) 120 takes into consideration which words were provided by the user and which words were generated by the system.

In some embodiments, the system(s) 120 may determine the encoded question data by determining word-level embeddings and character-level embeddings corresponding to each word in the question data. As described herein, the question data may include text data representing the domain name, the slot name, and/or the potential slot values. The system(s) 120 may character-level embeddings corresponding to each character in the dialog session data. The system(s) 120 may concatenate or combine the word-level embeddings and the character-level embeddings to determine the encoded question data.

Figure 2:
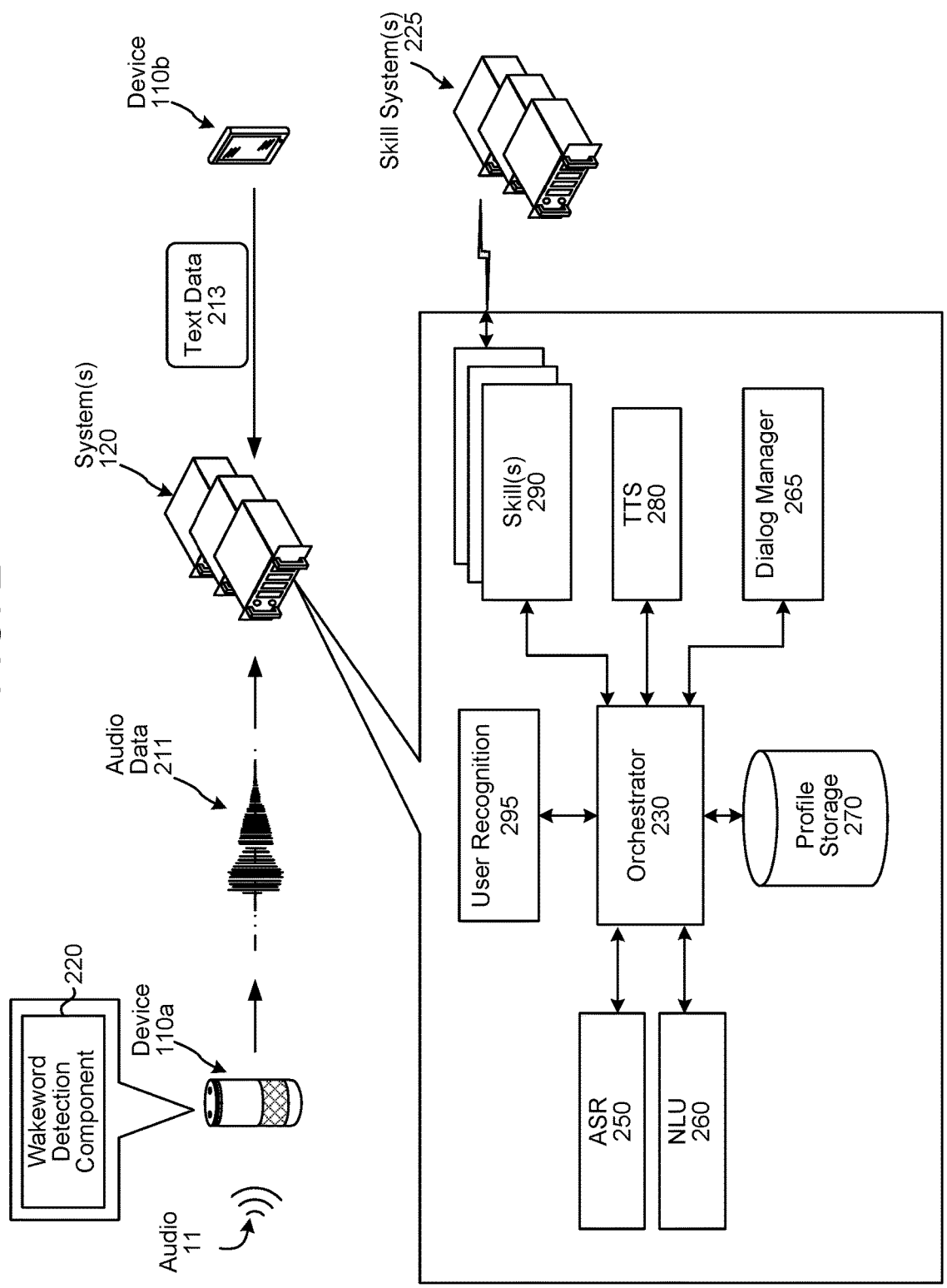
FIG. 2 is a conceptual diagram of speech processing components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component. An ASR component 250 of the speech processing component transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

Multiple skills may be associated with a domain. For example, domains may include restaurant, hotel, taxi, smart home, music, video, flash briefing, shopping, banking, weather, custom (e.g., skills not associated with any pre-configured domain), and others. The Pandora skill and the Spotify skill may be associated with the music domain, and the Uber skill and the Lyft skill may be associated with the taxi domain, for example.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include a dialog manager component 265 that manages and/or tracks a dialog between a user and a device. The dialog manager component 265 may associate a dialog session identifier with the dialog upon identifying that the user is engaging in a dialog with the user. The dialog manager component 265 may track a user input and the corresponding system generated response to the user input as a turn. The dialog session identifier may correspond to multiple turns of user input and corresponding system generated response. The dialog manager component 265 may transmit data identified by the dialog session identifier directly to the orchestrator component 230 or other component. Depending on system configuration the dialog manager 265 may determine slot values for a user input based on previous user inputs and/or system generated responses. In some embodiments, the dialog manager 265 may receive text data determined by the ASR component 250, and may determine the domain, slot and slot values corresponding to the user input. The dialog manager 265 may send the determined domain, slot and slot value to orchestrator 230 to generate an appropriate output, for example, perform the task requested by the user and/or generate a TTS response that is outputted to the user. Alternative embodiments, the dialog manager 265 may receive NLU data, including domain, slot and slot value information, corresponding to a first user input of a dialog session, and then the dialog manager 265 may determine the domain, slot and slot value corresponding to a second user input of the dialog session.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
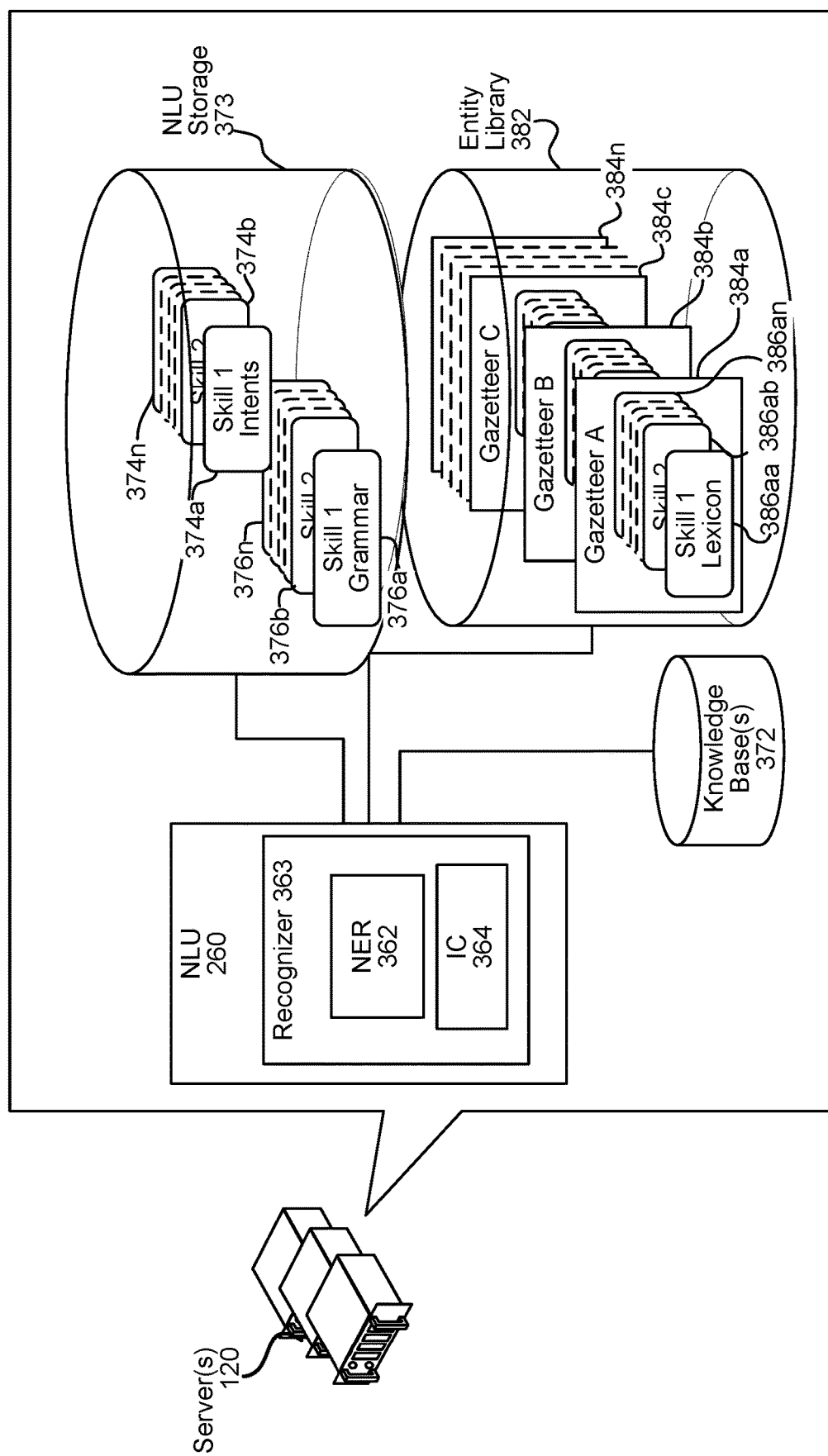
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
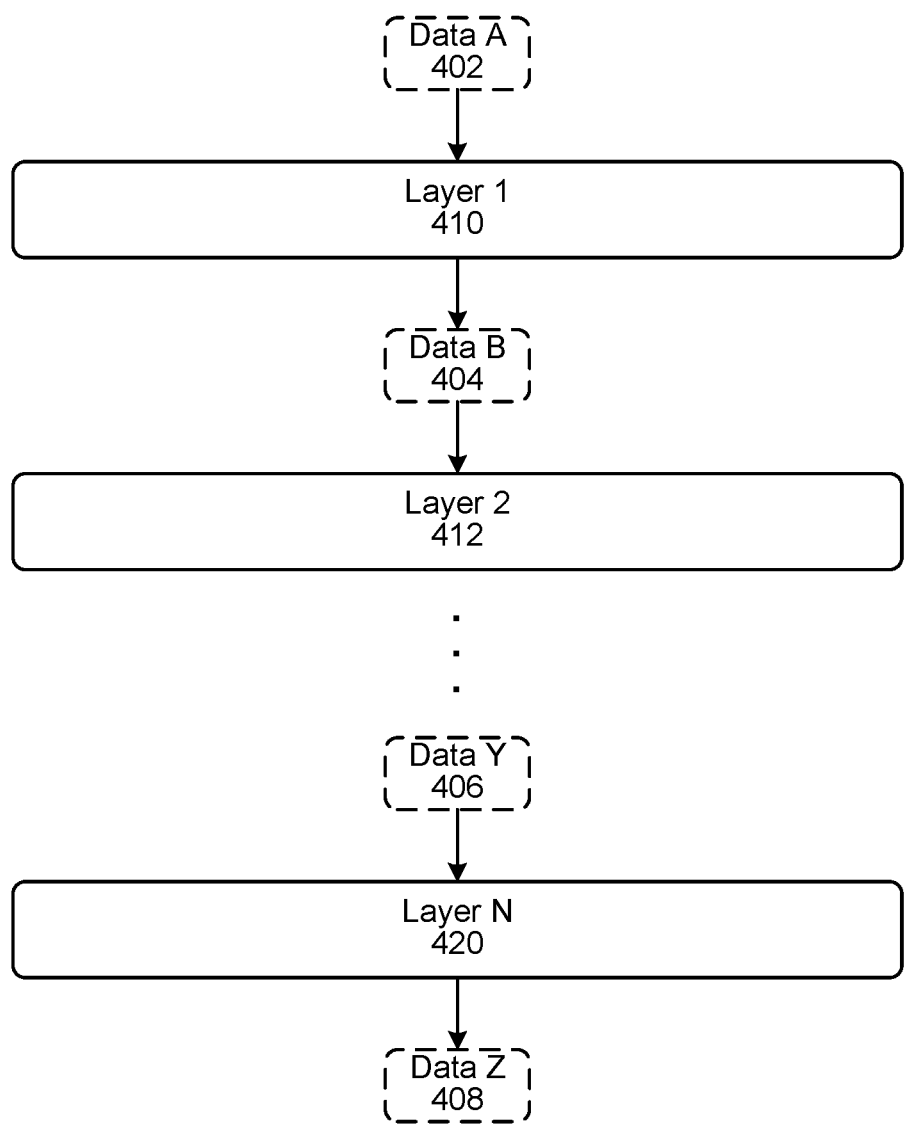
FIG. 4 is a conceptual diagram illustrating layers of a trained model according to embodiments of the present disclosure.

One or more components of the dialog tracker 265 may use trained models for operation. A trained model may take many forms, including a neural network. As illustrated in FIG. 4, a neural network may include a number of layers, from input layer 1 410 through output layer N 420. Each layer is configured to output a particular type of data and output another type of data. The neural network illustrated in FIG. 4 is configured to input data of type data A 402 (which is the input to layer 1 410) and output data of type data Z 408 (which is the output from the last layer N 420). The output from one layer is then taken as the input to the next layer. For example, the output data (data B 404) from layer 1 410 is the input data for layer 2 412 and so forth such that the input to layer N 420 is data Y 406 output from the penultimate layer (not shown).

While values for the input data/output data of a particular layer are not known until a neural network is actually operating during runtime, the data describing the neural network describes the structure and operations of the layers of the neural network.

Figure 5:
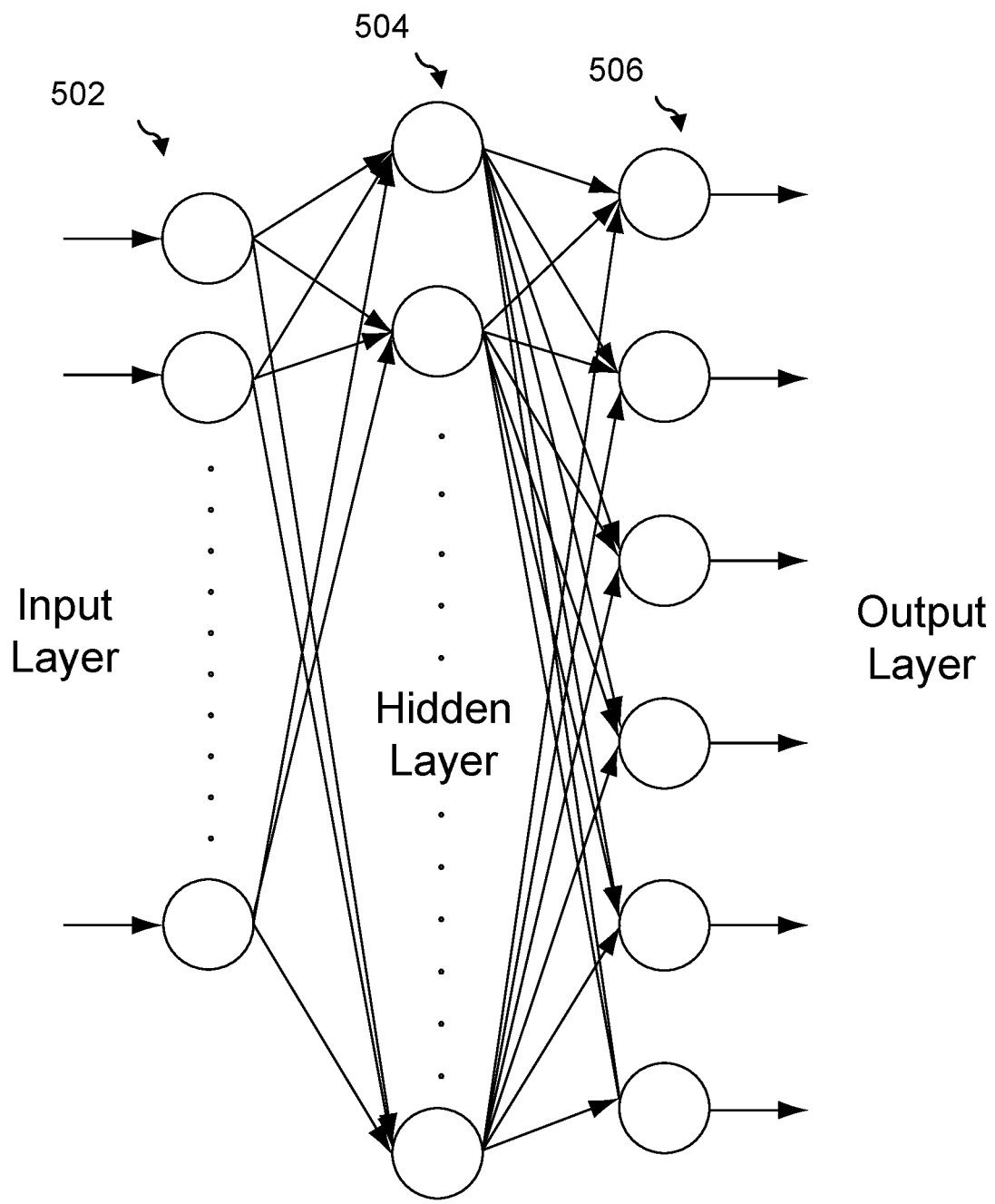
FIG. 5 illustrates a neural network for speech recognition according to embodiments of the present disclosure.

Neural networks may be used to perform dialog evaluation and/or scoring. An example neural network is illustrated in FIG. 5. A neural network may be structured with an input layer 502, a middle layer 504, and an output layer 506. The middle layer may also be known as the hidden layer. Each node of the hidden layer is connected to each node in the input layer and each node in the output layer. Although illustrated in FIG. 5 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 6:
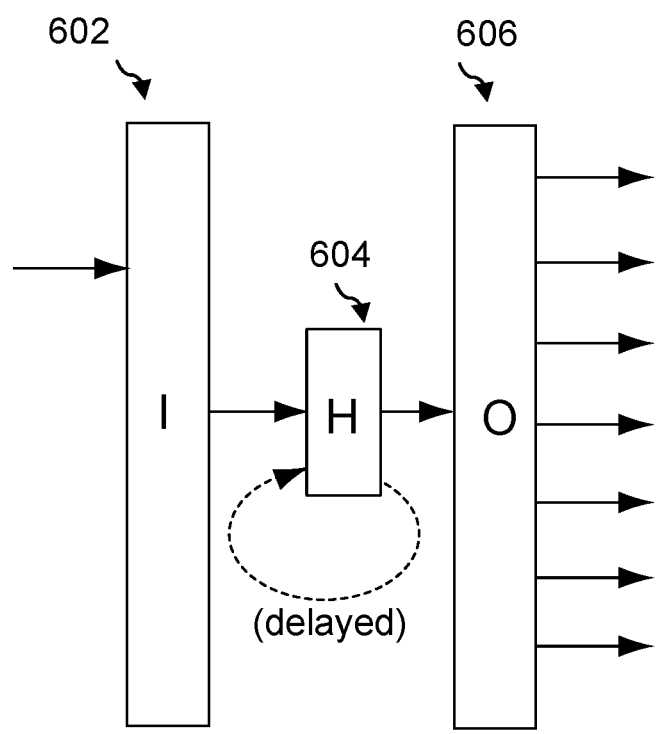
FIG. 6 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 6. Each node of the input layer 602 connects to each node of the hidden layer 604. Each node of the hidden layer 604 connects to each node of the output layer 606. As illustrated, the output of the hidden layer 604 is fed back into the hidden layer for processing of the next set of inputs. A neural network incorporating recurrent connections may be referred to as a recurrent neural network (RNN).

To perform various operations effectively certain techniques may be employed to incorporate certain information in a form that can be considered by a trained model. Such information may include, for example, dialog data from user inputs and system responses, etc. One such technique for putting information in a form operable by a trained model, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) relate to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

Figure 7:
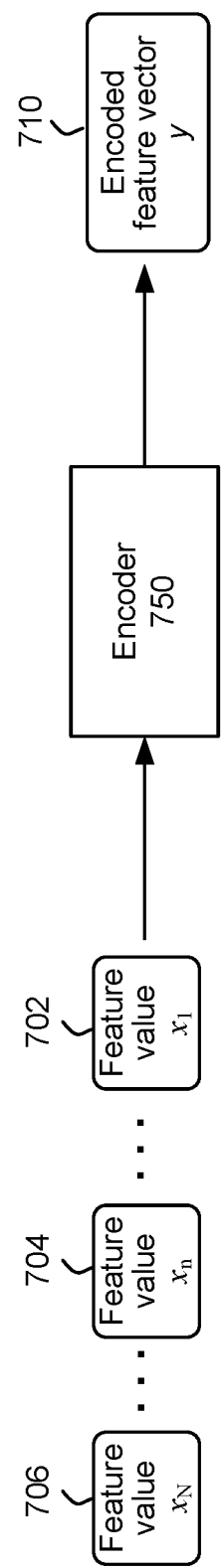
FIG. 7 illustrates operation of an encoder according to embodiments of the present disclosure.

FIG. 7 illustrates feature data values 702-706 being processed by an encoder 750 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. Any particular encoder 750 will be configured to output vectors of the same size, thus ensuring a continuity of output encoded vector size from any particular encoder 750 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence.

In addition, an attention model can be used, which is another RNN or DNN that learns to "attract" attention to certain parts of the input. The attention model can be used in combination with the above methods of consuming the input.

FIG. 7 illustrates operation of the encoder 750. The input feature value sequence, starting with feature value $x_1$ 702, continuing through feature value $x_n$ 704 and concluding with feature value $x_N$ 706 is input into the encoder 750. The encoder 750 may process the input feature values as noted above. The encoder 750 outputs the encoded feature vector y 710, which is a fixed length feature vector of length F. One or more encoders such as 750 may be used with the dialog rescorer engine 259 as indicated below.

For various operations, such as selecting and/or scoring potential dialog responses, a system may be configured to encode text data that may include one or more word sequences (for example dialog data from one or more previous exchanges with the system during a dialog) and use that encoded text data to score potential dialog responses.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Thus components of the system (such as a dialog manager 265) may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 8:
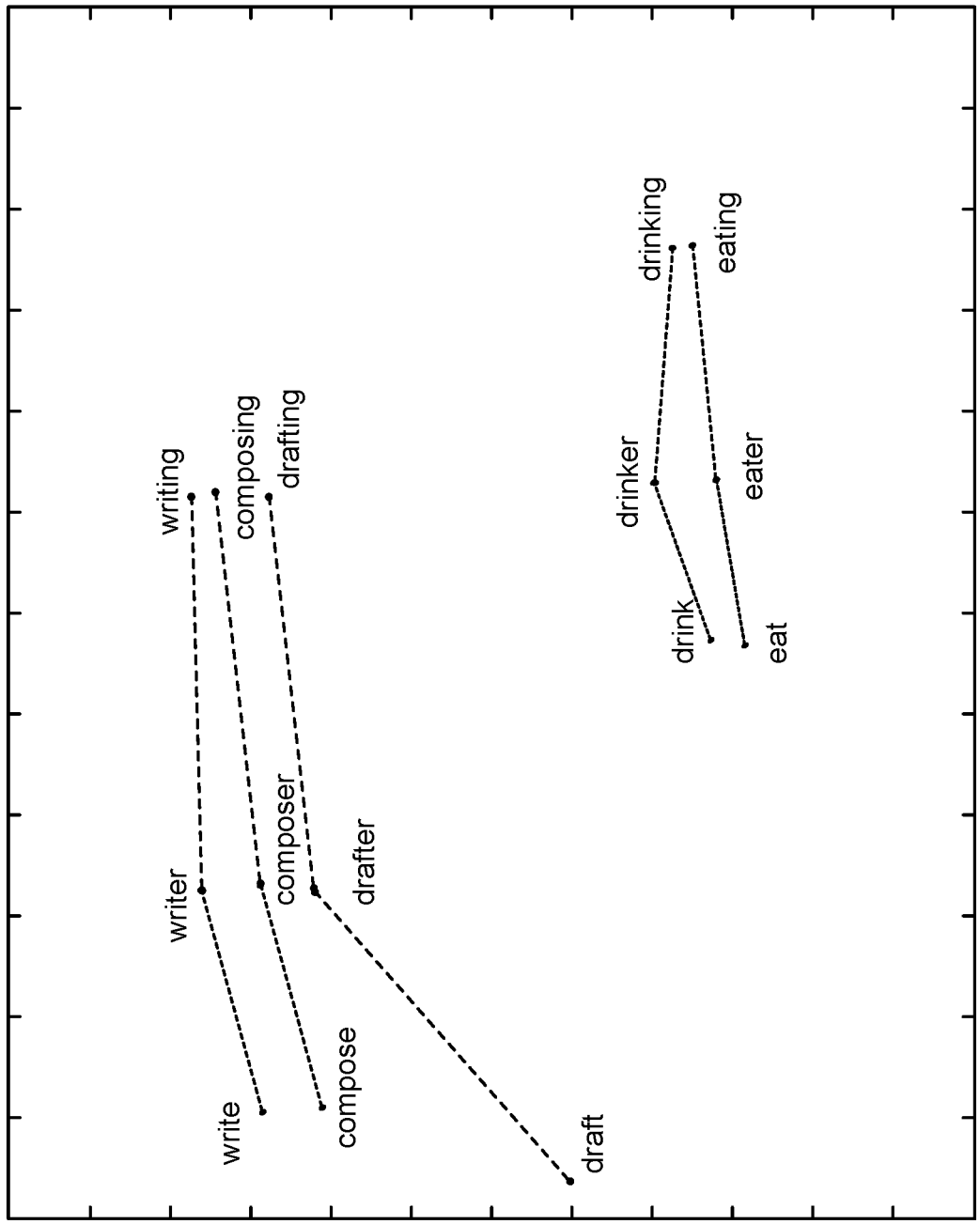
FIG. 8 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 8 illustrates a number of words in a hypothetical vector space where each point represents the vector location for the particular word. Although illustrated as located in a two-dimensional graph for discussion purposes, the usage vectors for the words illustrated in FIG. 8 would be in a high dimensional space. Further, FIG. 8 is shown for example purposes only and the vector locations/relationships do not necessarily reflect a true graphing of the usage of the illustrated words.

As illustrated in FIG. 8, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 8. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, Skip-Thought Vectors by Ryan Kiros, Yukun Zhu, Ruslan Salakhutdinov, Richard S. Zemel, Antonio Torralba, Raquel Urtasun, Sanja Fidler, Quick-Thought Vectors/Quick-Thought loss techniques by Lajanugen Logeswaran and Honglak Lee, and other techniques.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As can be appreciated, training, configuration, and structure of a particular trained model may impact the models performance at runtime.

Figure 9:
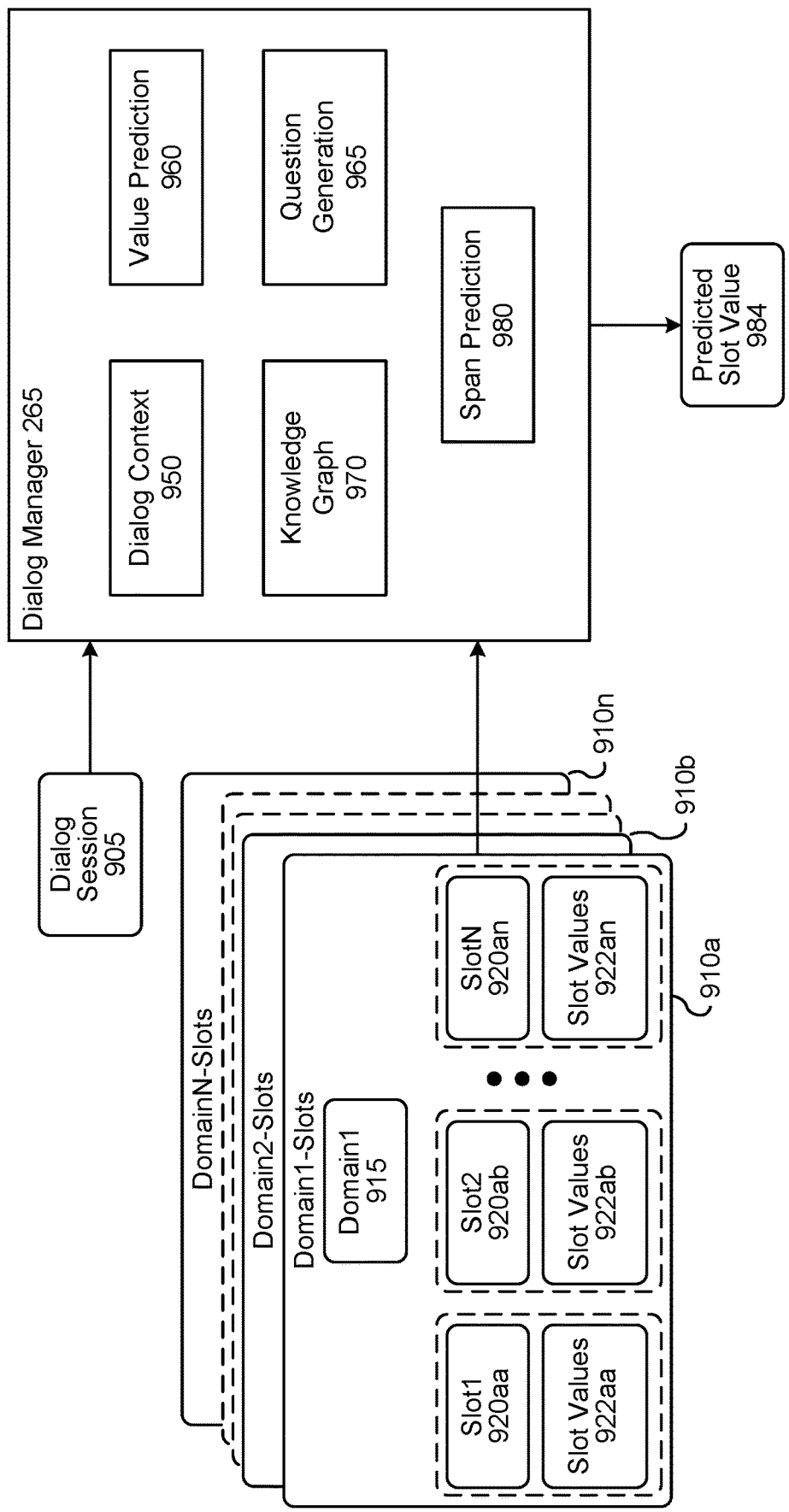
FIG. 9 is a conceptual diagram of a dialog manager used to track multi-domain dialog states according to embodiments of the present disclosure.

FIG. 9 is a conceptual diagram of the dialog manager 265 used to track multi-domain dialog states according to embodiments of the present disclosure. The dialog manager 265 may include a dialog context component 950, a value prediction component 960, a question generation component 965, a knowledge graph component 970, and a span prediction component 980. The operations of these components are described in conjunction with FIG. 10.

The dialog manager 265 may receive, retrieve or determine dialog session data 905. The dialog session data 905 may include text data representing user inputs (audio, text, or other types of inputs) during a particular dialog session and text data representing the system's response to the user inputs. The user inputs and system responses may be identified using the dialog session identifier, and the user inputs and system responses may be identified by a turn number. The dialog session data 905 may also include ASR and/or NLU data corresponding to the user input. The dialog session data 905 may also include other data relating to the dialog, such as, user profile data, device identifier, device type, device/user location, etc.

The dialog manager 265 may receive, retrieve or determine domain-slot data 910. The domain-slot data 910 may represent data relating to the domains supported by the system(s) 120. For example, the system may support domain1 (910a), domain2 (910b), . . . domainN (910n). As illustrated, each domain-slot data 910 may include domain data 915 representing the name of the domain and other data identifying the domain. As illustrated, each domain-slot data 910 includes slot data representing multiple slots, for example, slot1 920aa, slot2 920ab, . . . slotN 920an. The slot data 920 may represent the slot name and other data identifying the slot name. As illustrated, the domain-slot data 910 may include potential slot values 922 corresponding to each slot 920. For example, one or more potential slot values 922aa correspond to slot 920aa, one or more potential slot values 922ab correspond to slot 920ab, and so on. In some cases, slot 920 may not have potential slot values. For example, the system may include every possible entity name (e.g., hotel name, restaurant name, etc.) that may correspond to the slot 920. As another example, the slot 920 may relate to time, then the system may include every possible hour and minute as potential slot values.

For illustrations purposes, example domain-slot data 910 may include the data presented in the below Table 1.

TABLE 1

Example Domain ontology

| Domains | Restaurant | Hotel | Train | Attraction | Taxi |
| --- | --- | --- | --- | --- | --- |
| Slot Names | Name<br>Area<br>Price range<br>Food<br>Book people<br>Book time<br>Book day | Name<br>Area<br>Price range<br>Type<br>Parking<br>Stars<br>Internet<br>Book stay<br>Book day<br>Book people | Destination<br>Departure<br>Day<br>Arrive by<br>Leave at<br>Book people | Name<br>Area<br>Type | Destination<br>Departure<br>Arrive by<br>Leave at |

The dialog manager 265, using the components described below, may output the prediction slot value 984. In some cases, the predicted slot value 984 may be determined by the value prediction component 960 by selecting a potential slot value evaluated by the component 960 and having a highest likelihood or probability of being the slot value that corresponds to the slot of the user input. In other cases, the predicted slot value 984 may be determined by the span prediction component 980 which may determine a start value and an end value representing the slot value corresponding to the slot, or may be a single slot value corresponding to the slot.

In a multi-domain dialog state tracking system, assume, for discuss purposes, there are M domains D={$d_1, d_2, \ldots, d_M$}. For example, the domains may be 'restaurant', 'hotel', 'train', 'attraction', 'taxi', 'attraction', 'hospital', 'police', 'train', etc. Each domain d∈D may have $N^d$ slots $S^d$={$s_1^d, s_2^d, \ldots, s_{N^d}^d$}, and each slot s∈$S^d$ has KS possible values $V^s$={$v_1^s, v_2^s, \ldots, v_{K^s}^s$}. For example, the 'restaurant' domain may have a slot named 'price range', and the possible slot values may be 'cheap', 'moderate' and 'expensive'. Some slots may not have predefined potential values, that is, $V^s$ may be missing in the domain ontology. For example, the 'taxi' domain may have a slot named 'leave time', but it may not be possible to enumerate all the potential leave time the user may request, as the size of $V^s$ may be very large.

A dialog X may be represented as X={$U_1^a, U_1^u, U_2^a, U_2^u \ldots, U_T^a, U_T^u$}, where $U_t^a$ is the system (agent) response in turn t and $U_t^u$ is the user input/utterance in turn t. Each turn t is associated with a dialog state $y_t$. A dialog state $y_t$ is a set of (domain, slot, value) tuples. Each tuple represents, up to the current turn t, that the user has informed a slot s∈$S_d$ of domain d∈D, which takes the value v∈$V^s$. The system is configured to predict the dialog state $y_t$.

The system employs a question-answer model, more specifically, a reading comprehension problem, where to predict the dialog state at turn t, the system observes the dialog context $C_t$, which is the concatenation of {$U_1^a, U_2^u, U_2^a, U_2^u \ldots, U_T^a, U_T^u$}. The dialog context is processed (read) by the model to answer the questions defined as follows.

For each domain d∈D and each slot s∈$S_d$, if there exists a predefined value set $V^s$, then the question generation component 965 determines the question $Q_{d,s}$={d, s, $V^s$, 'not mentioned', 'don't care'}. That is, the question is a set of words or phrases which includes a domain name, a slot name, a list of potential slot values, and two special values 'not mentioned' and 'don't care'. One example of the constructed question generated by the component 965 for 'restaurant' domain and 'price range' slot is {'restaurant', 'price range', 'cheap', 'moderate', 'expensive', 'not mentioned', 'don't care'}. The constructed question represents the following natural language question: 'In the dialog up to turn t, did the user mention the 'price range' of the 'restaurant' he/she is looking for? If so, which of the following option is correct: A) cheap, B) moderate, C) expensive, D) don't care.'

In the case that $V^s$ is not available, the constructed question generated by the component 965 includes the domain and slot names along with the special values, that is, $Q_{d,s}$={d, s, 'not mentioned', 'don't care'}. For example, the constructed question for 'train' domain and 'leave time' slot is {'train', 'leave time', 'not mentioned', 'don't care'}, and it represents the following natural language question: 'In the dialog up to turn t, did the user mention the 'leave time' of the 'train' he/she is looking for? If so, what is the 'leave time' the user preferred?'

The system can be extended to recognize new domains, slots and slot values. Tracking new domains and slots can be achieved by adding data to the domain-slot data and configuring the system to construct questions to include the added domains, slots and slot values.

Although the multi-domain dialog state tracking system is formulated as a question-answering problem, there are some differences between the system described herein and a traditional question-answering model. In a traditional question-answering problem, understanding the question is one of the major challenges, and the questions are highly dependent on the context, moreover, questions are usually in many different forms. Meanwhile, in the system described herein, the forms of questions are limited to two types, and every turn the same set of questions are asked. But on the other hand, the system described herein has the following characteristics. For example, questions in consecutive turns tend to have same answers, and an answer is either a span of the context or a value from the potential values set.

Figure 10:
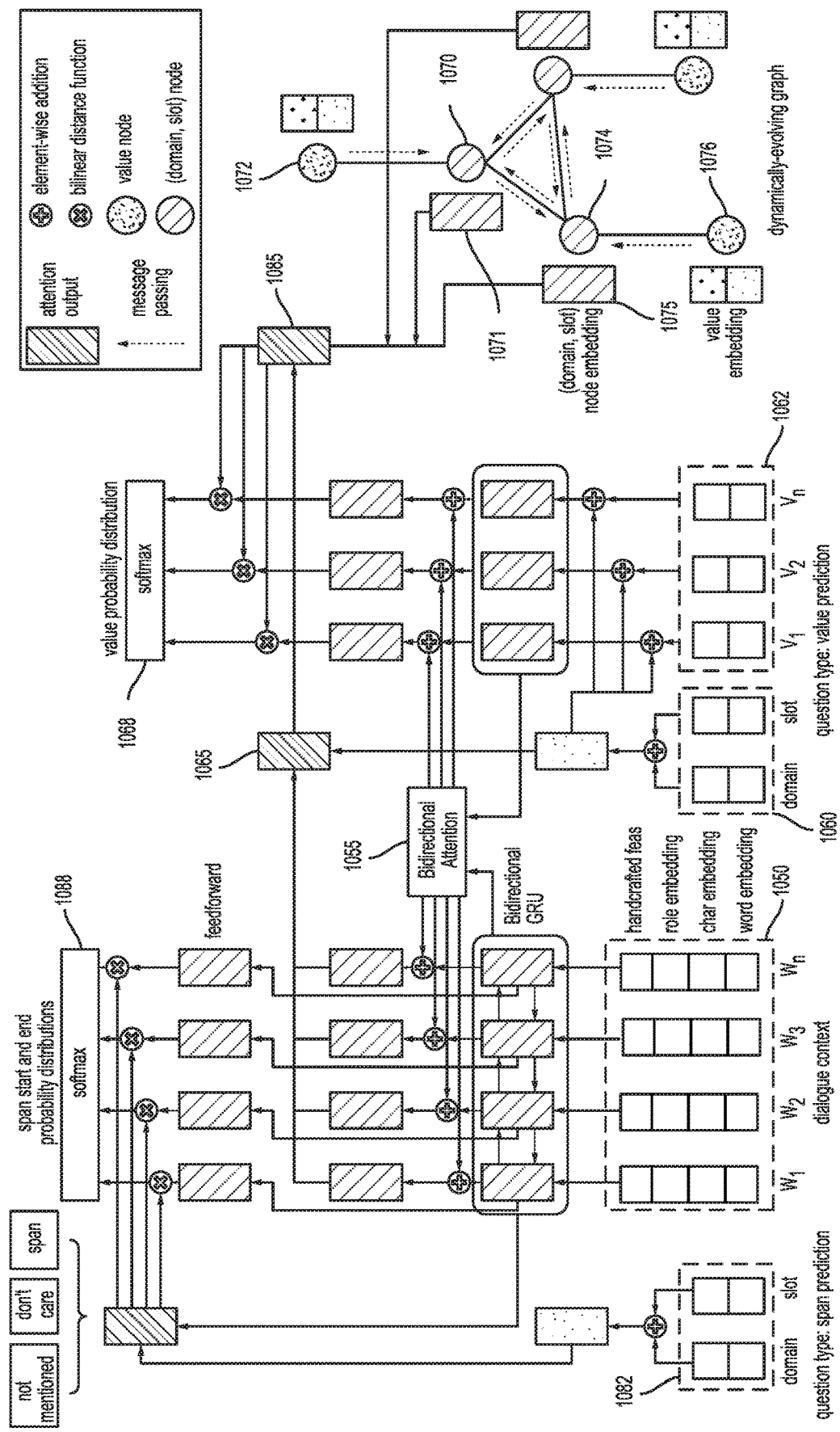
FIG. 10 illustrates processing of dialog data to determine slot values according to embodiments of the present disclosure.

FIG. 10 illustrates processing of dialog data using the question-answer model to determine slot values according to embodiments of the present disclosure. When a question's type is value prediction (that is, the slot values have limited number of potential values), the system applies a bidirectional attention layer to the dialog session/context data and the question data, and a graph embedding from the knowledge graph is injected to the output of the bidirectional attention layer. When a question's type is span prediction (that is, the slot values have a large number of potential values), then the system uses the question data to attend over the dialog session/context data to predict the span start and end positions for the slot value.

The dialog context component 950 may be configured to determine encoded dialog session data (1050) by determining a word embedding for each word in the dialog session data $C_t$ and a character embedding for each character in the dialog session data $C_t$. That is, the dialog context component 950 may determine a first word embedding corresponding to a first word in the dialog session data 905 where the first word may be the first word of the user input, a second word embedding corresponding to a second word in the dialog session data 905 where the second word may be the second word of the user input, and so on until all the words in the user input are processed. Then the dialog context component 950 may determine word embeddings corresponding to each word of the system response. Similarly, the dialog context component 950 may determine a first character embedding corresponding to the first character of the user input, and then determine character embeddings corresponding to each character of the system response.

In one embodiment, for each word in the dialog context data $C_t$, a character embedding layer based on a convolutional neural network is applied to obtain a $D^{Char}$ dimensional character-level embedding. In one embodiment, the dialog context component 950 then uses a deep contextualized word representations (e.g., ELMo), to get a $D^{Elmo}$ dimensional word-level embedding. The final word embedding of the dialog context data $C_t$ is the concatenation of the character-level embedding and the word-level embedding, and is denoted by $W^c \in \mathbb{R}^{L_c \times D^w}$, where $L_c$ is the number of words in context $C_t$ and $D^W = D^{ELMo} + D^{Char}$.

In some embodiments, the question data may include the domain name, slot name and the potential slot values, especially when the slot has limited number of potential values. The question generation component 965 may determine the encoded question data including the dialog context data (1060) and the potential slot values (1062) in a similar fashion. For example, in a question $Q_{d,s}$, each element in $Q_{d,s}$ (a domain name, a slot name and/or a slot value from the potential value set) is treated as a sentence and its word embedding is computed. The question generation component 965 then determines the mean of the word embeddings in each element as the embedding of that element. The question embedding is then represented by a set {$w^d \in \mathbb{R}^{D^w}$, $w^s \in \mathbb{R}^{D^w}$, $W^v \in \mathbb{R}^{L_v \times D^w}$}, where $w_d$, $w_s$ and $W^v$ are domain, slot and value embeddings respectively, and $L_{\bar{v}}$ is the number of values in $V^s$ plus 'not mentioned' and 'don't care'. In one embodiment, to represent the question embedding as a single matrix, the system defines $W^q \in \mathbb{R}^{L_{\bar{v}} \times D^w}$, where each row of $W^q$ is calculated by $W_{j,:}^q = w^d + w^s + w_{j,:}^{\bar{v}}$.

As shown in FIG. 10, the question generation component 965 may determine word-level embeddings and character-level embeddings for the domain name and the slot name (1060) and perform an element-wise addition for the domain name embeddings and the slot name embeddings to determine domain-slot embeddings (1064). The value prediction component 960 may determine word-level embeddings and char-level embeddings for a potential slot value $v_1$ (1062), perform an element-wise addition for the value $v_1$ and the domain-slot embeddings (1064), and process the resulting embedding using a neural network or other type of machine learning model.

The bidirectional attention mechanism 1055 may apply a bidirectional GRU to encode the dialog context data $C_t$, denoting the i-th word in the context $C_t$ by $w_i$. Then the input to the bidirectional GRU at time step i is the concatenation of the following three vectors as determined by the dialog context component 950: 1) word embeddings of $w_i$ denoted as $W_{i,:}^c$, 2) a corresponding role embedding, and 3) handcrafted features (e.g., exact match features). There are two possible role embeddings: the system/agent role embedding $e_a \in \mathbb{R}^r$ and the user role embedding $e_u \in \mathbb{R}^r$. If the corresponding word $w_i$ was part of the user utterance then the system concatenates the user role embedding to the word $w_i$, and if the corresponding word $w_i$ was part of the system response then the system concatenates the system role embedding.

The handcrafted features may represent exact match features as binary indicator features. For each (domain, slot) pair, the dialog context component 950 may search for occurrences of its values in the dialog context data in the original form and in the lemmatized form. Then for each (domain, slot) pair, the binary indicator features indicate whether $w_i$ belongs to an occurrence in either form. The final output of the bidirectional attention layer may be a matrix $E^c \in \mathbb{R}^{L_c \times D^{biGRU}}$, where $L_c$ is the number of words in the context $C_t$ and $D^{biGRU}$ is the dimension of the bidirectional GRU's hidden states (includes both forward and backward hidden states).

The bidirectional attention mechanism 1055 may apply a bidirectional attention layer which calculates attentions in two directions: from the dialog context data $C_t$ to the question data $Q_{d,s}$ and from the question data $Q_{d,s}$ to the dialog context data $C_t$. To do so, first an attention function $\mathbb{R}^{m*n} \times \mathbb{R}^n \to \mathbb{R}^m$ is defined. The inputs to the function are a key matrix $K \in \mathbb{R}^{m*n}$ and a query vector $q \in \mathbb{R}^n$. The function calculates the attention score of q over each row of K. Let $O \in \mathbb{R}^{m*n}$ be a matrix which is q repeated by m times, that is, $O_{j,:} = q$ for all j. Then, the attention function is defined as:

$$Att_\beta(K,q) = \text{Softmax}([K;O^T;K*O^T] \leq \beta)$$

where $\beta \in \mathbb{R}^{3n}$ is a model parameter to learn, * is the element-wise multiplication operator and [;] is matrix row concatenation operator. The subscript of $\beta$, $\beta_i$, indicates different instantiations of the attention function. The attention score of a dialog context word $w_i$ to values in $Q_{d,s}$ is given by $\alpha_i^v = Att_{\beta_1}(W^q, E_{i,:}^c) \in \mathbb{R}^{L_{\bar{v}}}$, and the attention score of a question value $v_j$ to words in $C_t$ is given by $\alpha_j^w = Att_{\beta_1}(E^c, W_{j,:}^q) \in \mathbb{R}^{L_c}$. $\beta_1$ is shared between these two attention functions. Then a dialog context word $w_i$'s question-dependent embedding is $B_i^{QD} = W^{q^T} \cdot \alpha_i^v$ and it can be viewed as the representation of $w_i$ in the vector space defined by the question $Q_{d,s}$. Similarly, a question value $v_j$'s context-dependent embedding is $B_j^{CD} = E^{c^T} \cdot \alpha_j^w$, and it can be viewed as the representation of $v_j$ in the vector space defined by the context $C_t$. The final dialog context embedding is $B^c = E^c + B^{QD} \in \mathbb{R}^{L_c \times D^w}$. The final question embedding is $B^q = B^{CD} + W^q \in \mathbb{R}^{L_{\bar{v}} \times D^w}$.

When $V^s$ exists in $Q_{d,s}$, the value prediction component 960 may calculate a score for each value in $Q_{d,s}$, and select the one with the highest score as the answer. First, the value prediction component 960 defines a bilinear function $\mathbb{R}^{m*n} \times \mathbb{R}^n \to \mathbb{R}^m$, which takes a matrix $X \in \mathbb{R}^{m*n}$ and a vector $y \in \mathbb{R}^n$, and returns a vector of length m.

$$\text{BiLinear}_\Phi(X,y) = X^T \Phi_y$$

where $\Phi \in \mathbb{R}^{n*n}$ is a model parameter to learn. The subscript of $\Phi$, $\Phi_i$, indicates different instantiations of the function. The value prediction component 960 may summarize context $B^c$ into a single vector with respect to the domain and slot, and then apply a bilinear function to calculate the score of each value. More specifically, the value prediction component 960 calculates the score of each value v at turn t by $$p_t^v = \text{Softmax}(\text{BiLinear}_{\Phi_1}(B^q, B^{c^T} \cdot \alpha^b))$$

where $\alpha^b = Att_{\beta_2}(B^c, w^d + w^s) \in \mathbb{R}^{L_c}$ is the attention score over $B^c$, and $p_t^v \in \mathbb{R}^{L_{\bar{v}}}$. The value prediction component 960 calculates the cross entropy loss of the predicted scores by $\text{Loss}_v = \Sigma_t \Sigma_{d \in D, s \in \hat{S}^d} \text{CrossEntropy}(p_t^v, y_t^v)$ where $y_t^v \in \mathbb{R}^{L_{\bar{v}}}$ is the label, which is the one-hot encoding of the true value of domain d and slot s, and $\hat{S}^d$ is the set of slots in domain d that has pre-defined $V^s$.

The value prediction component 960 may thus determine, using the softmax output 1068, probability distributions for the potential slot values. The value prediction component 960 may select the potential slot value with the highest probability score for further processing, including performing actions using the domain, slot and slot value, generating a response to the user input using the domain, slot and slot value, etc.

The question data determined by the question generation component 965 for span prediction may include the domain name and the slot name (and no potential slot values). The span prediction component 980 may be configured to process and predict slot values for slots that have a large number or infinite number of potential values. As shown in FIG. 10, the question generation component 965 may determine word-level embeddings and character-level embeddings for the domain name (1080), word-level embeddings and character-level embeddings for the slot name (1080), and perform an element-wise addition to determine domain-slot embeddings (1082) to determine the question data.

When the value set $V^s$ is unknown or too large to enumerate, such as pick up time in taxi domain, the span prediction component 980 predicts the answer to a question $Q_{d,s}$ as either a span in the dialog context data 905 or two special types: 'not mentioned' and 'don't care'. The span prediction layer has two components. The span prediction component 980 first predicts the answer type of $Q_{d,s}$. The type of the answer is either 'not mentioned', 'don't care' or 'span', and is calculated by $$p_t^{st} = \text{Softmax}(\varphi_1 \cdot (w^d + w^s + E^{c^T} \cdot \alpha^e))$$

where $\alpha^e = Att_{\beta_3}(E^c, d^w + w^s) \in \mathbb{R}^{L_c}$, $\Theta_1 \in \mathbb{R}^{3*D^w}$ is a model parameter to learn, and $p_t^{st} \mathbb{R}^3$. The loss of span type prediction is $\text{Loss}_{st} = \Sigma_t \Sigma_{d \in D, s \in \hat{S}^d} \text{CrossEntropy}(p_t^{st}, y_t^{st})$ where $y_t^{st} \in \mathbb{R}^3$ is the one-hot encoding of the true span type label, and $\bar{S}^d$ is the set of slots in domain d that has no predefined $V^s$. The span prediction component then predicts a span in the context corresponding to the answer of $Q_{d,s}$. To get the probability distribution of a span's start index, the span prediction component 980 applies a bilinear function between the dialog context data and the (domain, slot) pair. More specifically, $$p_t^{st} = \text{Softmax}(\text{BiLinear}_{\Theta_2}(\text{Relu}(E^c \cdot \Theta_2), (w^d + w^s + E^{C^T} \cdot \alpha^e)))$$

where $\Theta_2 \in \mathbb{R}^{D^w * D^w}$ and $p_t^{st} \in \mathbb{R}^{L_c}$. The bilinear function's first argument is a non-linear transformation of the context embedding, and its second argument is a context-dependent (domain, slot) pair embedding. The prediction loss is $$\text{Loss}_{ss} = \Sigma_t \Sigma_{d \in D, s \in \bar{S}^d} \text{CrossEntropy}(p_t^{ss}, y_t^{ss})$$

where $y_t^{ss} \in \mathbb{R}^{L_c}$ is one-hot encodings of true start indices. The probability distribution of a span's end index $p_t^{se}$ and the loss $\text{Loss}_{se}$ is calculated in a similar way. The score of a span is the multiplication of probabilities of its start and end index. The final loss function is: $\text{Loss} = \text{Loss}_v + \text{Loss}_{st} + \text{Loss}_{ss} + \text{Loss}_{se}$.

The span prediction component 980 may thus determine, using the softmax output 1088, probability distributions of the span start and end for the slot value, if the slot value is determined to not be one of the special values ('not mentioned' or 'don't care').

The knowledge graph component 970 may be configured to track the predicted (domain, slot) values for a dialog session. The (domain, slot) pairs for each turn are not independent, that is there is some relationship between each turn that can be used to predict the (domain, slot) pair for the next turn. For example, if a user requested a train for 3 people, then the number of people for hotel reservation may also be 3. If a user booked a restaurant, then the destination of the taxi is likely to be that restaurant. There may be four types of relationships between (domain, slot) pairs an example domain ontology such as that illustrated in Table 1:

1. (s, $r_v$, s'): a slot $s \in S^d$ and another slot $s' \in S^{d'}$ have the same set of possible values. That is, $V^s$ equals to $V^{s'}$. For example, in the domain ontology of Table 1, domain-slot pairs ('restaurant', 'book day') and ('hotel', 'book day') have this relationship.

2. (s, $r_s$, s'): the value set of a slot $s \in S^d$ is a subset of the value set of $s' \in S^{d'}$. For example, value sets of ('restaurant', 'name'), ('hotel', 'name'), ('train', 'station') and ('attraction', 'name') are subsets of the value set of ('taxi', 'destination').

3. (s, $r_c$, s'): the informed value $v \in V^s$ of slots is correlated with the informed value $v \in V^{s'}$ of slot s' even though $V^s$ and $V^{s'}$ do not overlap. For example, the price range of a reserved restaurant is correlated with the star rating of the booked hotel. This relationship is not explicitly given in the ontology.

4. (s, $r_i$, v): the user has informed value $v \in V^s$ of slot $s \in S^d$

The knowledge graph component 970 improves the question-answer model by exploiting such relationship information. The knowledge graph component 970 determines a graph representing (domain, slot) pairs and values as nodes in a graph linked by the relationship defined above, and then propagates information between them. The graph is dynamically evolving, since the fourth relationship above, $r_i$, depends on the dialog session/context data.

The right-hand side of FIG. 10 is an example of the graph defined based on the ontology. There are two types of nodes {M, N} in the graph. One is a (domain, slot) pair node 1070, 1074 representing a (domain, slot) pair in the ontology, another is a value node 1072, 1076 representing a value from a value set. For a domain $d \in D$ and a slot $s \in S^d$, the corresponding node is denoted by $M_{d,s}$, and for a value $v \in V^s$, the corresponding node by $N_v$. There are also two types of edges. One type is the link between M and N. At each turn t, if the answer to question $Q_{d,s}$ is $v \in V^s$, then $N_v$ is added to the graph and linked to $M_{d,s}$. By default, $M_{d,s}$ is linked to a special 'not mentioned' node. The other type of edges is the link between nodes in M In one embodiment, the nodes in M are linked based on the relationships described above. However, while $r_v$ and $r_s$ are known given the ontology, $r_c$ is unknown and cannot be inferred just based on the ontology. As a result, in one embodiment, every node in M is connected with each other, and the question-answer model is configured to learn their relationships with an attention mechanism described below.

An attention mechanism 1065 may process the dialog context data 1050 and the domain-slot data 1060, by their corresponding embeddings or other data derived from other processing (e.g., bidirectional GRU processing for the dialog context data 1050, deep layer/neural network processing, etc.). The attention mechanism 1085 may be configured to provide attention between the dialog context data 1050 and the domain-slot data, using the output of the attention mechanism 1065, and the knowledge graph. The attention mechanism 1085 may employ an attention mechanism to calculate the importance of a node's neighbors to that node, and then aggregate node embeddings based on attention scores. The attention mechanism 1085 may be configured to attend over the graph nodes using the dialog context.

The attention mechanism 1085 may perform two steps. In the first step, the mechanism 1085 may propagate the embedding of $N_v$ to its linked $M_{d,s}$, so that the embedding of $M_{d,s}$ (1071, 1075) depends on the value prediction from previous turns. The attention mechanism 1085 propagates $N_v$'s embedding by $g_{d,s} = (w^d + w^s) + (1-\eta)\sigma(\Theta_3 \cdot W_{v,:})$, where $g_{d,s} \in \mathbb{R}^{D^w}$ is the new embedding of $M_{d,s}$, $\eta \in [0, 1]$ is a hyper-parameter, and $\Theta_3 \in \mathbb{R}^{D^w \times D^w}$ is a model parameter to learn. $g_{d,s}$ carries the following information: in previous turns, the user has mentioned value v of a slot s from a domain d. In one embodiment, the attention mechanism 1085 determines $g_{d,s} = w^d + w^s + W_{v,:}\bar{v}$.

The second step the attention mechanism 1085 performs is to propagate information between nodes in M. For each domain d and slot s, $B^{c^T} \cdot \alpha^b$ is the summarized context embedding with respect to d and s. The attention mechanism 1085 uses this vector to attend over all nodes in M, and the attention score is $\alpha^g = \text{Att}_{\beta_4}(G, B^{c^T} \cdot \alpha^b)$, where $G \in \mathbb{R}^{|M|*D^w}$ is a matrix stacked by $g_{d,s}^T$. Using context embeddings to attend over the graph allows the model to assign importance score of each node based on dialog contexts. Finally, he graph embedding is $z_{d,s} = G \cdot \alpha^g$. The attention mechanism 1085 injects $z_{d,s}$ to the equation used to calculate the score by the value prediction component 950 using softmax with a gating mechanism:

$$p_t^v = \text{Softmax}(\text{BiLinear}_{\Phi_1}(B^q, (1-\gamma)B^{C^T} \cdot \alpha^b + \gamma z_{d,s}))$$

where $\gamma = \sigma(B^{C^T} \cdot \alpha^b + Z_{d,s})$ is the gate and controls how much graph information should flow to the context embedding given the dialog context. Some utterances such as "book a taxi to Cambridge station" do not need information in the graph, while some utterances such as "book a taxi from the hotel to the restaurant" needs information from other domains corresponding to previous turns of the dialog session. γ dynamically controls in what degree the graph embedding is used. These graph parameters may be trained along with the all other parameters of the question-answer model.

Figure 11:
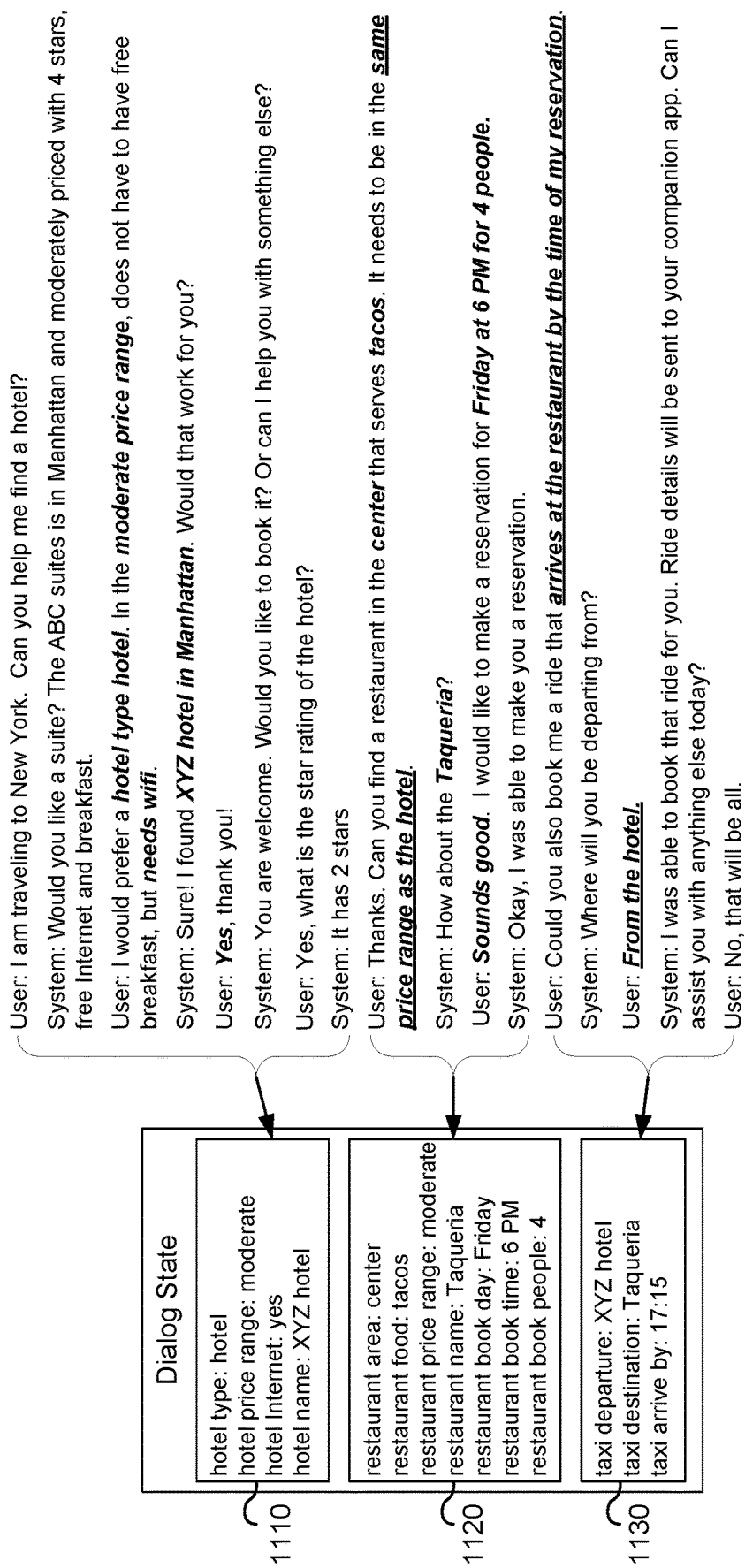
FIG. 11 illustrates an example dialog session between a user and the system.

FIG. 11 illustrates an example dialog session between a user and the system. The right-hand side shows a dialog that involves 3 domains, and the left hand-side shows the dialog state for each turn. The bolded text indicates mentions and paraphrases of slot values, and the underlined text indicates places where multi-turn inferences are required. For example, the box 1110 represents the (domain, slot) values for the first domain of the dialog session. As shown, the first domain is 'hotel' and the slot names and corresponding slot values are: 'type'="hotel", 'price range'="moderate", 'Internet'="yes", and 'name'="XYZ hotel." The box 1120 represents the (domain, slot) values for the second domain of the dialog session. The second domain is 'restaurant' and the slot names and corresponding slot values are: 'area'="center", 'food'="tacos", 'price range'="moderate", 'name'="Taqueria", 'book day'="Friday", 'book time'="6 PM", 'book people'="4". The box 1130 represents the (domain, slot) values for the third domain of the dialog session. The third domain is 'taxi' and the slow names and corresponding slot values are: 'departure'="XYZ hotel", 'destination'="Taqueria", 'arrive by'="6 PM".

Figure 12:
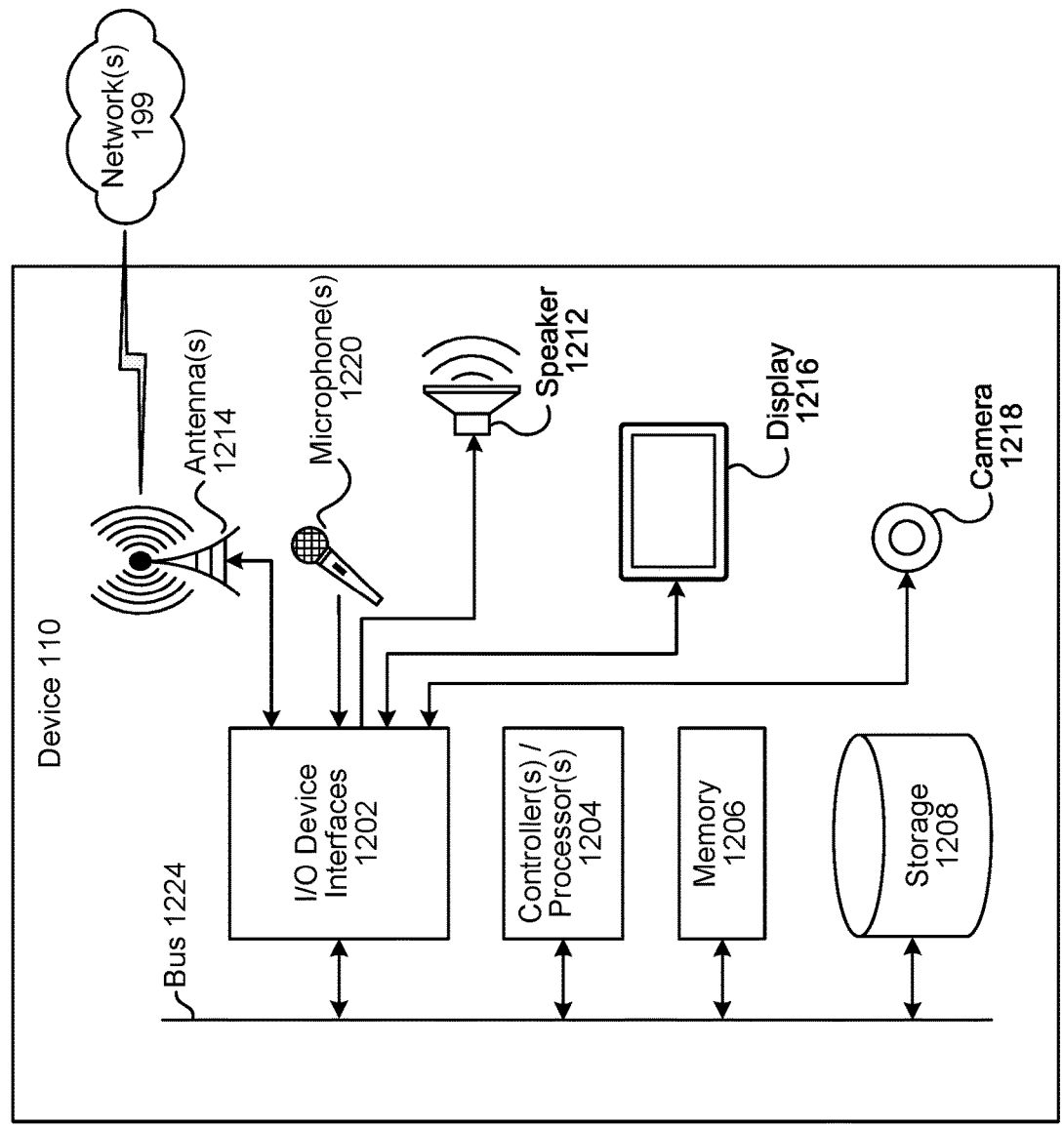
FIG. 12 is a block diagram conceptually illustrating example components of a device according to embodiments of the present disclosure.
Figure 13:
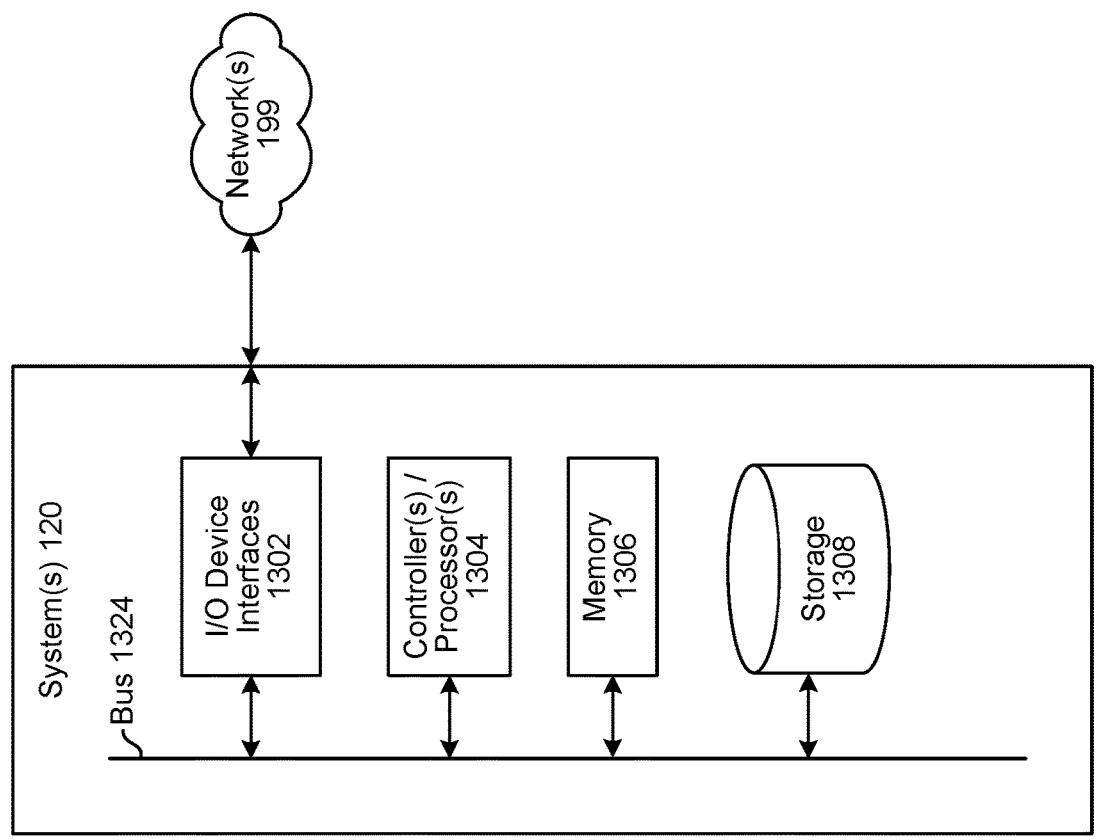
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, a grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones 1220, a wired headset or a wireless headset (not illustrated), etc. If an array of microphones 1220 is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the I/O device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1202/1302) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1202/1302), processor(s) (1204/1304), memory (1206/1306), and/or storage (1208/1308) of the device(s)

110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 14:
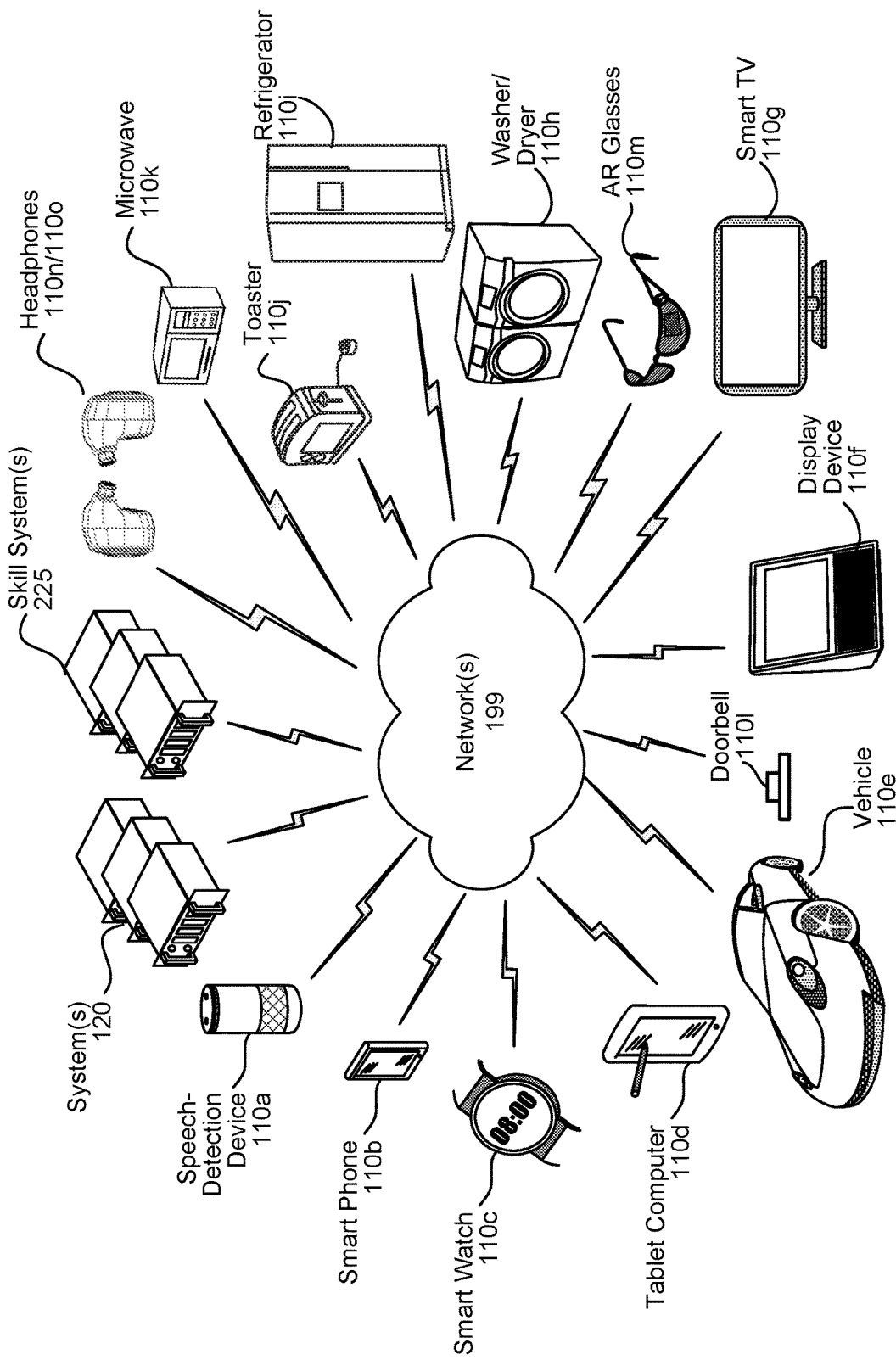
FIG. 14 illustrates an example of a computer network for use with the speech processing system.

As illustrated in FIG. 14, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, a microwave 110k, a doorbell 110l, augmented reality (AR) glasses 110m, and/or wireless headphones 110n/110o may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first utterance text data representing a first utterance of a dialog session;
receiving first system response text data representing a first system-generated response of the dialog session;
receiving second utterance text data representing a second utterance of the dialog session;
receiving second system response text data representing a second system-generated response of the dialog session;
processing the first utterance text data, the first system response text data, the second utterance text data, and the second system response text data to determine encoded dialog session data;
determining domain data representing a domain name corresponding to the second utterance text data;
determining slot name data corresponding to the domain name, the slot name data representing a first slot name corresponding to the second utterance text data;
determining first potential slot data corresponding to the first slot name;
determining second potential slot data corresponding to the first slot name;

determining question text data using the domain data, the slot name data, the first potential slot data and the second potential slot data, wherein the question text data represents a question to determine a slot value using a previous utterance of the dialog session;

processing the question text data to determine encoded question data;

processing, using a trained model, the encoded dialog session data and the encoded question data to determine a first score and a second score, the first score corresponding to the first potential slot data and the second score corresponding to the second potential slot data, the trained model configured to predict a slot value for a slot name;

selecting, using the first score and the second score, the first potential slot data; and using at least the domain data, the slot name data and the first potential slot data, generate output data responsive to the second utterance.

2. The computer-implemented method of claim 1, further comprising:
determining a previous utterance of the dialog session;
determining a previous domain name represented in the previous utterance;
determining a previous slot name represented in the previous utterance;
determining a previous slot value corresponding to the previous slot name;
determining a second domain name corresponding to the first utterance;
determining a second slot name corresponding to the first utterance;
determining a second slot value corresponding to the second slot name;
determining a portion of a knowledge graph by:
  determining a first node connected to a second node, the first node representing the previous domain name and the previous slot name, the second node representing the previous slot value, and
  determining a third node connected to a fourth node, the third node representing the second domain name and the second slot name, the fourth node representing the second slot value, wherein the first node is connected to the third node;
processing the first node and the second node to determine first dialog state embedding data; and
processing the third node and the fourth node to determine second dialog state embedding data,
wherein processing using the trained model further comprises processing the encoded dialog session data, the encoded question data, the first dialog state embedding data and the second dialog state embedding data.

3. The computer-implemented method of claim 1, wherein processing to determine the encoded dialog session data comprises:
determining a first word embedding corresponding to a first word represented in the first utterance text data;
determining a first character embedding corresponding to a first character represented in the first utterance text data; and
determining the encoded dialog session data using at least the first word embedding and the first character embedding.

4. The computer-implemented method of claim 1, wherein processing the question text data to determine the encoded question data comprises:

processing the domain data to determine a first word embedding corresponding to the domain name;
processing the domain data to determine a first character embedding corresponding to a first character corresponding to the domain name;
processing the slot name data to determine a second word embedding corresponding to the slot name;
processing the slot name data to determine a second character word embedding corresponding to a second character corresponding to the slot name;
processing the first potential slot data to determine a third word embedding corresponding to a third word represented in the first potential slot data;
processing the first potential slot data to determine a third character embedding corresponding to a third character represented in the first potential slot data; and
determining the encoded question data using at least the first word embedding, the first character embedding, the second word embedding, the second character embedding, the third word embedding and the third character embedding.

5. A computer-implemented method comprising:
receiving text data representing a first user input and a first system response, the first user input and the first system response corresponding to a dialog session;
determining domain data representing a domain name corresponding to the first user input;
determining slot name data corresponding to the domain name, the slot name data representing a slot name corresponding to the first user input;
determining that the slot name corresponds to a predefined number of slot values;
determining at least first slot data corresponding to the slot name;
determining question data using the domain data, the slot name data and the first slot data, wherein the question data represents a question to determine a slot value using a previous user input of the dialog session;
processing the text data and the question data to determine a first slot value corresponding to the slot name; and
generating output data using at least the slot value.

6. The computer-implemented method of claim 5, further comprising:
processing the domain data to determine a first word embedding corresponding to the domain name;
processing the domain data to determine a first character embedding corresponding to a first character corresponding to the domain name;
processing the slot name data to determine a second word embedding corresponding to the slot name;
processing the slot name data to determine a second character word embedding corresponding to a second character corresponding to the slot name;
processing the first slot data to determine a third word embedding corresponding to a third word represented in the first slot data;
processing the first slot data to determine a third character embedding corresponding to a third character represented in the first slot data; and
determining encoded question data using the first word embedding, the first character embedding, the second word embedding, the second character embedding, the third word embedding and the third character embedding.

7. The computer-implemented method of claim 6, further comprising:
processing the text data to determine a fourth word embedding corresponding to a fourth word represented in the text data;
processing the text data to determine a fourth character embedding corresponding to a fourth character represented in the text data; and
determining encoded text data using at least the fourth word embedding and the fourth character embedding,
wherein processing the text data and the question data to determine the first slot value comprises processing, using a trained model, the encoded question data and the encoded text data to determine the first slot value.

8. The computer-implemented method of claim 7, further comprising:
determining that the fourth word corresponds to the first user input;
determining user embedding data indicating that the fourth word corresponds to the first user input;
determining that a fifth word of the text data corresponds to the first system response; and
determining system embedding data indicating that the fifth word corresponds to the first system response,
wherein determining the encoded text data comprises further using the user embedding data and the system embedding data.

9. The computer-implemented method of claim 5, wherein determining the text data comprises determining the text data representing the first user input, the first system response and a previous user input of the dialog session, the previous user input being received prior to the first user input,
wherein processing the text data and the question data comprises determining, using a trained model, that the first slot value corresponds to a second slot value represented in the previous user input.

10. The computer-implemented method of claim 9, further comprising:
determining a second domain name represented in the previous user input, the second domain name being different than the domain name represented in the first user input.

11. The computer-implemented method of claim 5, further comprising:
determining second text data representing a previous user input and a previous system response of the dialog session;
determining second domain data representing a second domain name corresponding to the previous user input;
determining second slot name data corresponding to the second domain name, the second slot name data representing a second slot name corresponding to the previous user input;
determining at least second slot data corresponding to the second slot name;
processing, using a trained model, the second text data, the second domain data, the second slot name data and the second slot data to determine a second slot value corresponding to the second slot name;
determining a graph comprising a first node and a second node, the first node representing the second domain name and the second slot name, the second node representing the second slot value;
processing the first node and the second node to determine previous dialog state embedding data; and
determining the first slot value using the previous dialog state embedding data.

12. The computer-implemented method of claim 5, further comprising:
determining second text data representing a second user input and a second system response;
determining second domain data representing a second domain name corresponding to the second user input;
determining second slot name data corresponding to the second domain name, the second slot name data representing a second slot name corresponding to the second user input;
determining that the second slot name corresponds to more than the predefined number of slot values;
determining second question data using the second domain data and the second text data;
processing the second text data and the second question data to determine a second slot value corresponding to the second slot name; and
generating second output data using at least the second slot value.

13. A system comprising:
at least one processor; and
at least one memory including instructions that, when executed by the at least one processor, cause the system to:
receiving text data representing a first user input and a first system response, the first user input and the first system response corresponding to a dialog session;
determine domain data representing a domain name corresponding to the first user input;
determine slot name data corresponding to the domain name, the slot name data representing a slot name corresponding to the first user input;
determine that the slot name corresponds to a predefined number of slot values;
determine at least first slot data corresponding to the slot name;
determine question data using the domain data, the slot name data and the first slot data, wherein the question data represents a question to determine a slot value using a previous user input of the dialog session;
process the text data and the question data to determine a first slot value corresponding to the slot name; and
generate output data using at least the slot value.

14. The system of claim 13, wherein the instructions that, when executed by the at least one processor, further cause the system to:
process the domain data to determine a first word embedding corresponding to the domain name;
process the domain data to determine a first character embedding corresponding to a first character corresponding to the domain name;
process the slot name data to determine a second word embedding corresponding to the slot name;
process the slot name data to determine a second character word embedding corresponding to a second character corresponding to the slot name;
process the first slot data to determine a third word embedding corresponding to a third word represented in the first slot data;
process the first slot data to determine a third character embedding corresponding to a third character represented in the first slot data; and
determine encoded question data using the first word embedding, the first character embedding, the second word embedding, the second character embedding, the third word embedding and the third character embedding.

15. The system of claim 14, wherein the instructions that, when executed by the at least one processor, further cause the system to:
process the text data to determine a fourth word embedding corresponding to a fourth word represented in the text data;
process the text data to determine a fourth character embedding corresponding to a fourth character represented in the text data; and
determine encoded text data using at least the fourth word embedding and the fourth character embedding,
wherein the instructions that cause the system to process the text data and the question data to determine the first slot value further cause the system to process, using a trained model, the encoded question data and the encoded text data to determine the first slot value.

16. The system of claim 15, wherein the instructions that, when executed by the at least one processor, further cause the system to:
determine that the fourth word corresponds to the first user input;
determine user embedding data indicating that the fourth word corresponds to the first user input;
determine that a fifth word of the text data corresponds to the first system response; and
determine system embedding data indicating that the fifth word corresponds to the first system response,
wherein the instructions that cause the system to determine the encoded text data further causes the system to determine the encoded text data using the user embedding data and the system embedding data.

17. The system of claim 13, wherein the instructions that, when executed by the at least one processor, cause the system to determine the text data further causes the system to determining the text data representing the first user input, the first system response and a previous user input of the dialog session, the previous user input being received prior to the first user input,
wherein the instructions that cause the system to determine the first slot value cause the system to determine, using a trained model, that the first slot value corresponds to a second slot value represented in the previous user input.

18. The system of claim 17, wherein the instructions that, when executed by the at least one processor, further cause the system to:
determine a second domain name represented in the previous user input, the second domain name being different than the domain name represented in the first user input.

19. The system of claim 13, wherein the instructions that, when executed by the at least one processor, further cause the system to:
determine second text data representing a previous user input and a previous system response of the dialog session;
determine second domain data representing a second domain name corresponding to the previous user input;
determine second slot name data corresponding to the second domain name, the second slot name data representing a second slot name corresponding to the previous user input;
determine at least second slot data corresponding to the second slot name;
process, using a trained model, the second text data, the second domain data, the second slot name data and the second slot data to determine a second slot value corresponding to the second slot name;
determine a graph comprising a first node and a second node, the first node representing the second domain name and the second slot name, the second node representing the second slot value; and
process the first node and the second node to determine previous dialog state embedding data,
wherein the instructions that cause the system to determine the first slot value causes the system to determine the first slot value using the previous dialog state embedding data.

20. The system of claim 13, wherein the instructions that, when executed by the at least one processor, further cause the system to:
determine second text data representing a second user input and a second system response;
determine second domain data representing a second domain name corresponding to the second user input;
determine second slot name data corresponding to the second domain name, the second slot name data representing a second slot name corresponding to the second user input;
determine that the second slot name corresponds to more than the predefined number of slot values;
determine second question data using the second domain data and the second text data;
process the second text data and the second question data to determine a second slot value corresponding to the second slot name; and
generate second output data using at least the second slot value.

* * * * *